US011191283B2

(12) United States Patent
Assing et al.

(10) Patent No.: US 11,191,283 B2
(45) Date of Patent: Dec. 7, 2021

(54) METHOD AND INSTALLATION FOR THE TREATMENT OF LIQUID FOOD PRODUCTS

(71) Applicant: GEA TDS GmbH, Sarstedt (DE)

(72) Inventors: Hubert Assing, Ahaus (DE); Helmut Buss, Heiden (DE); Uwe Schwenzow, Ahaus (DE); Roland Stange, Gronau-Epe (DE); Ludger Tacke, Velen (DE); Dietrich Zimmermann, Hallstadt (DE)

(73) Assignee: GEA TDS GmbH, Sarstedt (DE)

( * ) Notice: Subject to any disclaimer, the term of this patent is extended or adjusted under 35 U.S.C. 154(b) by 122 days.

(21) Appl. No.: 16/314,887

(22) PCT Filed: Jul. 10, 2017

(86) PCT No.: PCT/EP2017/000812
§ 371 (c)(1),
(2) Date: Jul. 12, 2019

(87) PCT Pub. No.: WO2018/010837
PCT Pub. Date: Jan. 18, 2018

(65) Prior Publication Data
US 2019/0350232 A1    Nov. 21, 2019

(30) Foreign Application Priority Data

Jul. 14, 2016 (DE) ..................... 10 2016 008 558.4

(51) Int. Cl.
*A23C 3/037* (2006.01)
*F04D 1/14* (2006.01)
(Continued)

(52) U.S. Cl.
CPC ................ *A23C 3/037* (2013.01); *A23C 3/04* (2013.01); *A23L 3/001* (2013.01); *A23L 3/24* (2013.01);
(Continued)

(58) Field of Classification Search
CPC ... A23L 3/001; A23L 3/24; A23L 3/36; A23L 5/13; A23C 3/037–3/0375; A23C 3/04;
(Continued)

(56) References Cited

U.S. PATENT DOCUMENTS 1,809,526 A * 6/1931 Namur .................. F04D 29/628
                                                   416/186 R
2,492,635 A * 12/1949 Hawk ..................... F04D 31/00
                                                   426/474
(Continued)

FOREIGN PATENT DOCUMENTS

AT            268060 B    6/2004
DE    102009006248 A1    7/2010
(Continued)

OTHER PUBLICATIONS

PCT/EP2017/000812; Filed Jul. 10, 2017; International Search Report; dated Oct. 26, 2017; 2 pages.
(Continued)

*Primary Examiner* — Drew E Becker
(74) *Attorney, Agent, or Firm* — Young Basile Hanlon & MacFarlane, P.C.

(57) ABSTRACT

A method for treating liquid food products after direct heating comprises a first cooling of the liquid food product occurring on a floor of the infuser vessel up to an outlet opening. A second cooling of the liquid food product occurs in a tubular section connecting directly to the outlet opening. A third cooling of the liquid food product occurs in a housing cover of a pump housing of a centrifugal pump. At least one flushing operation of the pump housing and of an impeller via a rear impeller gap is performed, wherein the at least flushing operation occurs via a front impeller gap located between the housing cover and the impeller. Volume
(Continued)

flows of the at least one flushing operation are greater than equalization flows within the pump housing.

12 Claims, 3 Drawing Sheets

(51) Int. Cl.
    *F04D 29/58*     (2006.01)
    *F04D 29/62*     (2006.01)
    *A23L 3/36*     (2006.01)
    *A23L 3/00*     (2006.01)
    *A23L 3/24*     (2006.01)
    *A23C 3/04*     (2006.01)

(52) U.S. Cl.
    CPC ............... *A23L 3/36* (2013.01); *F04D 1/14* (2013.01); *F04D 29/588* (2013.01); *F04D 29/622* (2013.01); *F04D 29/628* (2013.01); *F05D 2260/607* (2013.01)

(58) Field of Classification Search
    CPC ........ F04D 29/588; F04D 1/14; F04D 29/622; F04D 2260/607; F04D 29/2216; F04D 29/167; F04D 7/04; F04D 1/00; F05D 2210/11; F05D 2260/607
    See application file for complete search history.

(56) References Cited

U.S. PATENT DOCUMENTS

| | | | | |
|---|---|---|---|---|
| 3,128,051 | A * | 4/1964 | Smith | F04D 29/2211 |
| | | | | 415/121.1 |
| 3,711,218 | A | 1/1973 | Kennel et al. | |
| 3,771,434 | A * | 11/1973 | Davies | A23C 3/0375 |
| | | | | 99/454 |
| 4,390,350 | A * | 6/1983 | Palm | A23C 3/0375 |
| | | | | 422/26 |
| 5,092,230 | A * | 3/1992 | Bronnert | A23C 3/0375 |
| | | | | 73/313 |
| 5,544,571 | A * | 8/1996 | Nahra | A23C 3/0375 |
| | | | | 261/116 |
| 5,881,638 | A * | 3/1999 | Kjærulff | A23C 3/0375 |
| | | | | 99/453 |
| 6,513,422 | B1* | 2/2003 | Palm | A23C 3/037 |
| | | | | 261/116 |
| 2003/0170112 | A1 | 9/2003 | Kao | |
| 2004/0062635 | A1 | 4/2004 | Serio | |
| 2008/0000362 | A1* | 1/2008 | Ringstrom | B01D 5/0006 |
| | | | | 99/485 |
| 2012/0321771 | A1* | 12/2012 | Kowalik | A23L 3/18 |
| | | | | 426/511 |
| 2013/0039745 | A1* | 2/2013 | Daugaard | F04D 7/045 |
| | | | | 415/122.1 |
| 2016/0138604 | A1* | 5/2016 | Manninen | F04D 29/2233 |
| | | | | 416/174 |
| 2017/0215447 | A1* | 8/2017 | Thorsen | G02B 1/18 |
| 2020/0037625 | A1* | 2/2020 | Pedersen | A23C 3/033 |
| 2020/0146305 | A1* | 5/2020 | Schwenzow | F04D 29/426 |

FOREIGN PATENT DOCUMENTS

| | | |
|---|---|---|
| DE | 102010008448 A1 | 8/2011 |
| EP | 0784706 B1 | 1/1999 |
| EP | 0794706 B1 | 8/2000 |
| WO | 2010086082 A1 | 8/2010 |
| WO | 2011101077 A1 | 8/2011 |
| WO | 2016/012025 A1 | 1/2016 |
| WO | 2016012026 A1 | 1/2016 |

OTHER PUBLICATIONS

Office Action for corresponding Canadian Application No. 3,031,357, dated Mar. 8, 2021, 6 pgs.

* cited by examiner

METHOD AND INSTALLATION FOR THE TREATMENT OF LIQUID FOOD PRODUCTS

CROSS REFERENCE TO RELATED INVENTION

This application is a national stage application pursuant to 35 U.S.C. § 371 of International Application No. PCT/EP2017/000812, filed on Jul. 10, 2017, which claims priority to, and benefit of, German Patent Application No. 10 2016 008 558.4, filed Jul. 14, 2016, the entire contents of which are hereby incorporated by reference.

TECHNICAL FIELD

The invention relates to a method and installation for the treatment of heat-sensitive liquid baby food concentrates, nutritive beverages or milk used to make cheese, in which steam directly heats the liquid food product for the formation of a sterile state in an infuser vessel, in which water in an amount corresponding with that of the previously supplied steam is removed from the liquid food product by decompression to a lower pressure, and in which the liquid food product is subjected to a conveyance between the heating and the decompression by means of a first conveying apparatus designed as a centrifugal pump. Furthermore, the invention relates to a centrifugal pump for such an installation and an impeller for such a centrifugal pump.

BACKGROUND

Heat-sensitive, liquid food products of the aforementioned type contain a relative high amount of protein, a lot of dry matter and little water; and they can have a low, medium or high viscosity. The term "heat sensitivity" should be understood below in that these food products, preferably at temperatures above 100° C., tend to burn, i.e. form deposits on the walls of the infuser vessel and the centrifugal pump conveying it under these conditions. This deposit formation is also called product contamination. Product contamination reduces the service life or respectively the operating time of the infuser vessel and in particular the centrifugal pump between two cleaning cycles.

Particularly critical areas of the installation for carrying out the method are the bottom area of the infuser vessel, which tapers downwards into an outlet opening, and a conveying apparatus, which is arranged in a connection line between the outlet opening of the infuser vessel and a vacuum chamber serving to decompress the heated, liquid food product. The conveying apparatus can be a displacement pump, for example a geared pump, or also a centrifugal pump. The conveying apparatus is arranged at a distance from the infuser vessel or directly at its outlet opening. An accumulation of heated, liquid food product in the bottom area of the infuser vessel and in the connected connection line up to the conveying apparatus leads to an undesired and undefined dwell time. A sump of heated, liquid food product must be avoided in particular in the infuser vessel. There has thus been no lack of suggestions for remedying this deficiency.

It is known in the case of heating installations with an infuser vessel to perform the discharge of the directly heated liquid food product out of the infuser vessel with a rotating displacement pump, for example a geared pump, wherein its housing has a cooling and the housing connects directly to the outlet opening of the infuser vessel (EP 0 784 706 B1). A geared pump has a design-inherent self-cleaning capability because the gear wheels cog together closely and rub along the associated housing walls and thus prevent a continuously increasing deposit formation (product contamination).

WO 2011/101077 A1, which utilizes the priority of DE 10 2010 008 448 A1, discloses a UHT installation for treating heat-sensitive liquid food products, in which among other things a first conveying device is arranged downstream of an infuser vessel in a connection line to a vacuum chamber, which is designed as a displacement pump. In its bottom area, a bottom part tapering to an outlet opening, the infuser vessel has a cooling of this bottom part. The displacement pump can thereby be arranged at an unquantified distance to the outlet opening from the infuser vessel or, in an edge case, this outlet opening flows directly into the displacement pump. In the case of the displacement pump, a rotating version is preferably used, which can be designed for example, as mentioned above, as a geared pump or also as a vane pump, a mixed-flow pump, impeller pump or rotary-piston pump. Oscillating displacement pumps can also generally be used if the volume flow fluctuations caused by the oscillating operation are compensated for by suitable means or are irrelevant in the treatment process.

In WO 2016/012026 A1, the installation known from EP 0 794 706 B1 is modified for the heat treatment of heat-sensitive liquid food to the effect that, with an otherwise unchanged configuration of the individual aggregates of the installation, the cooling shell surrounding the floor of the infuser vessel, which serves to cool the floor, now extends down the pump and, according to an advantageous embodiment, into the pump housing. The pump is a displacement pump, preferably a geared pump or a piston pump. However, a centrifugal pump is also claimed without specifying exactly how this centrifugal pump is structurally designed. It can thus be assumed that a conventional and hydraulically optimized centrifugal pump known in its general structure to a person skilled in the art is provided here.

WO 2010/086082 A1, which utilizes the priority of DE 10 2009 006 248 A1, describes an infusion system for a liquid food product to be heated, in which an infusion chamber has a lower bottom part with a cooling. The infusion chamber continues in an outlet pipe connecting to an outlet opening in the lower bottom part and also having a cooling. It remains open whether the outlet pipe flows directly or indirectly into a conveying apparatus designed in any way via a connection line.

A centrifugal pump for unproblematic liquid food products, such as water, is sufficiently known in its general structure. It is configured and designed such that it has the highest possible hydraulic efficiency, i.e. that it achieves the largest possible product of volume flow and delivery height with a certain operating power. An impeller with blades is arranged on a shaft in a pump housing generally consisting of at least two housing parts. Within the pump housing, a distributor in the form for example of a spiral housing or a bladeless annular space connects to the outside of an impeller outlet cross-section surrounding it in an annular manner. On the intake-side housing part, a housing cover, an outlet is located coaxially to the impeller axis, generally designed as a so-called intake connector, and running tangentially on the circumferential side, an inlet, which is generally designed as a so-called pressure connector. With the housing part, the housing rear wall, facing away from the intake side, the impeller pressure rear side forms a so-called rear wheel side space, which generally has a low axial extension in terms of a good hydraulic efficiency of the centrifugal pump. This axial or gap-wide extension is measured just closely enough that the mechanical functionality of the centrifugal pump is guaranteed in the case of acceptable production tolerances. In the same manner, an impeller front side, and here this is the front, face-side free blade edges in the case of a so-called open impeller, is adjusted with the narrowest possible gap to the progression of the housing cover. In order to reduce an axial force resulting from the pressure forces acting on the impeller on both sides, several pressure compensation bore holes with relatively small diameters are generally arranged in the hub area of the impeller and distributed over its circumference on the rear side of the impeller.

In the case of heat-sensitive liquid food products of the initially named type, it is paramount that there is the least possible tendency towards deposits on the walls of the centrifugal pump during their conveyance through a centrifugal pump. For example, in the case of the direct heating of very heat-sensitive liquid food products in an infuser vessel and subsequent discharge of the heated liquid food product out of the infuser vessel by means of a downstream centrifugal pump of the conventional construction, i.e. a hydraulically optimized construction, it has been shown that this centrifugal pump became clogged and shut down due to product contamination in a very short period of time, which hereby involved seconds up to a few minutes. Particularly critical areas are the intake area of the impeller, because undissolved gases and in particular uncondensed steam can strengthen the product contamination, and the narrow, gap-wide rear wheel side space.

For the concrete design of a centrifugal pump in an installation for treating heat-sensitive liquid food products, in which the latter undergo direct heating by means of culinary steam, up until now, no satisfactory solution in terms of a sufficiently long service life of the centrifugal pump is known.

The object of the present invention is to create a method of the generic type, an installation for carrying out said method as well as a centrifugal pump for said installation and an impeller for said centrifugal pump, which reduce the tendency for production contamination in the infuser vessel and from there into the centrifugal pump during the treatment of heat-sensitive liquid food products of the initially named type, wherein in particular the centrifugal pump has a considerably lengthened service life in relation to a hydraulically optimized centrifugal pump according to the prior art. A further object consists in modifying a preferably commercially available centrifugal pump such that it inhibits growth of product contamination in its critical areas and the desired service life extension is thereby achieved.

BRIEF SUMMARY OF THE INVENTION

The invention emanates procedurally from a method for the treatment of heat-sensitive liquid food products, such as milk protein concentrates, baby food, liquid baby food concentrates, nutritive beverages or milk used to make cheese, in which steam directly heats the liquid food product for the formation of a sterile state in an infuser vessel, in which water in an amount corresponding with that of the previously supplied steam is removed from the liquid food product by decompression to a lower pressure, in which the liquid food product is subjected to a conveyance between the heating and the decompression by means of a first conveying apparatus designed as a centrifugal pump.

The object underlying the invention is solved if in the case of the method of the generic type the following treatment steps (a) to (d) after provided after the direct heating, the liquid food product:

(a) is subjected to a generally known first cooling at least on the vessel floor of the infuser vessel up to an outlet opening located there;

(b) is subjected to a second cooling in a tubular section connecting directly to the outlet opening, which is formed either by an outlet pipe leading out of the infuser vessel or by an intake connector of the centrifugal pump;

(c) is subjected to a third cooling in a housing cover of a pump housing of the centrifugal pump, which connects directly to the outlet pipe or the intake connector; and (d) serves, with a part of its volume flow conveyed in an impeller of the centrifugal pump, which volume flow is configured to be open toward the housing cover of the centrifugal pump, for at least one planned flushing operation of the pump housing and of the impeller via a rear impeller gap, which is provided between a housing rear wall of the centrifugal pump and the impeller, and via a front impeller gap, which is provided between the housing cover and the impeller, wherein the volume flows of the planned flushing operations are up to several times greater than the inevitable equalization flows within the pump housing, which result from a hydraulically optimized design of the centrifugal pump with an in each case minimal rear and front impeller gap, which ensure the mechanical functionality of the centrifugal pump.

Step (d) concerns a substantially inventive solution concept. The steps (a) to (c) ensure that a further inventive fundamental concept, namely the gapless cooling of the heated liquid food product accumulated in the floor area of the infuser vessel and conveyed up to the pressure connector of the centrifugal pump, is given a concrete solution.

In order to intensify the cooling, one design of the method provides that the liquid food product is subjected to a fourth cooling in the housing rear wall of the pump housing.

According to an advantageous design of the method, a first and a second flushing operation of the pump housing and of the impeller are generated respectively by recirculation via the impeller, driven respectively by pressure differences in the pump housing. The first flushing operation thereby takes place via the rear impeller gap between the impeller and the housing rear wall, wherein the first flushing operation engages in the flow through the impeller. The second flushing operation takes place via the front impeller gap between the housing cover and the impeller, wherein the second flushing operation also engages in the flow through the impeller. Furthermore, a third flushing operation takes place by equalizations flows between a respective pressure side and intake side of a blade of the open impeller and via the front impeller gap, wherein the measures generating the second flushing operation inevitably result in the third flushing operation.

The gapless cooling of the heated liquid food product is achieved as provided by a related first suggestion if the coolings are each operated separately from each other. A second suggestion, which reduces the related technical cooling effort, provides with respect to the cooling that at least two coolings are connected in series. In both cases, the coolings are operated in the counterflow to the heated liquid food product for the optimization of the cold transfer performance, as provided by a third suggestion.

An installation according to the invention for carrying out the method according to the invention has the combination of the following, partially known characteristics:

an infuser vessel, in which steam directly heats the liquid food product for the formation of a sterile state;

a vacuum chamber in fluid-accessible connection with the infuser vessel via a connection line, in which water in an amount corresponding with that of the previously supplied steam is removed from the heated liquid food product by decompression to a lower pressure;

a first conveying apparatus arranged in the connection line and designed as a centrifugal pump for conveying the heated liquid food product from the infuser vessel to the vacuum chamber;

an outlet opening arranged in a vessel floor of the infuser vessel for the removal of the heated liquid food product;

a tubular section connecting to the outlet opening for the transfer of the heated liquid food product, which is formed either by an outlet pipe leading out of the infuser vessel or by an intake connector of the centrifugal pump;

a vessel-floor-side cooling medium space for the cooling of the heated liquid food product loading the vessel floor;

an outlet-pipe-side cooling medium space or an intake-connector-side cooling medium space for the cooling of the heated liquid food product flowing through the tubular section;

a pump housing of the centrifugal pump, which is formed at least by a housing cover and a housing rear wall and has a housing-cover-side cooling medium space for the cooling of the conveyed heated liquid food product;

the centrifugal pump, which has an impeller open toward the housing cover and which is designed such that, with a part of the volume flow of the heated liquid food product conveyed in the impeller, at least one planned flushing operation of the pump housing and of the impeller takes place via a rear impeller gap, which is provided between the housing rear wall and the impeller, and via a front impeller gap, which is provided between the housing cover and the impeller, and wherein the volume flows of the planned flushing operations are up to several times greater than the inevitable equalization flows within the pump housing, which result from a hydraulically optimized design of the centrifugal pump with an in each case minimal rear and front impeller gap, which ensure the mechanical functionality of the centrifugal pump.

The latter characteristic complex represents, in addition to the characteristics for the cooling, an important aspect of the installation according to the invention.

In order to intensify the cooling, a further embodiment provides that the pump housing has a housing-rear-wall-side cooling medium space.

In order to realize a first flushing operation, it is suggested that it takes place via the rear impeller gap between the impeller and the housing rear wall en route via at least one flushing bore hole arranged in the impeller rear side. With respect to a second flushing operation, a further suggestion provides that it takes place via the front impeller gap between the housing cover and the impeller. Furthermore, a third flushing operation takes place by equalization flows between a respective pressure and intake side of a blade of the open impeller and via the front impeller gap, wherein the measures generating the second flushing operation inevitably result in the third flushing operation.

The gapless cooling of the heated liquid food product is achieved as provided by a related first suggestion if the vessel-floor-side cooling medium space, the outlet-pipe-side or the intake-connector-side cooling medium space, the housing-cover-side cooling medium space and the housing-rear-wall-side are supplied with cooling medium separately from each other. A second suggestion, which reduces the technical cooling effort, provides with respect to the cooling that at least two cooling medium spaces are connected with each other in series.

A centrifugal pump according to the invention, which is suitable for an installation for the treatment of heat-sensitive liquid food products, emanates from a generally known centrifugal pump with an inlet, an outlet, a pump housing, which is formed by at least one housing cover and one housing rear wall, a pump chamber designed in the pump housing and being in fluid-accessible connection with the inlet and the outlet, and an impeller with blades rotatably accommodated in the pump chamber. A blade channel, which is designed open toward the housing cover and closed by an impeller rear side toward the housing rear wall, is respectively designed between two neighboring blades. A rear impeller gap is provided between the housing rear wall and the impeller and a front impeller gap is provided between the housing cover and the impeller.

The inventive fundamental idea is that the impeller itself and its adjacent critical areas up to the immediate pump-housing-side boundary of the impeller front side and the impeller rear side are flushed with the liquid food product to be conveyed and product contamination is thus inhibited there, wherein a further inventive fundamental idea consists in that at least pump-housing-side boundaries in the area of the housing cover are simultaneously cooled in the course of the flushing operation according to the invention.

The liquid food product thus serves with a part of its volume flow conveyed in the impeller planned flushing operations of the pump housing and the impeller itself. The volume flows of the planned flushing operations are thereby up to several times greater than the inevitable equalization flows in the pump housing, which result from a technically notorious hydraulically optimized design of the centrifugal pump. This design area is not to be understood by a person skilled in the art as an area specification that is open on the top, but is rather designed in the specific application such that a required service life of the centrifugal pump is achieved while ensuring the required throughput rate of the installation and thus the centrifugal pump under economical criteria. The ratio of the planned volume flows, resulting from the measures according to the invention, to the volume flows of the inevitable equalization flows, as a consequence of the technically notorious hydraulically optimized design, lies between 1.5 and 10, preferably between 2 and 5, in the case of the specific realization and depending on the application. By cooling, the tendency for the liquid food product to burn onto the walls of the centrifugal pump is reduced. This occurs under a planned abandonment of an optimal hydraulic efficiency. In the centrifugal pump according to the invention, a volume flow is conveyed in the impeller, which is increased by the sum of all quasi recirculating flush volume flows with respect to the volume flow suctioned via the intake connector. The flush volume flows convey volumes out of the core of the blade channels to the cooled walls of the housing and from there back into the impeller, wherein the cooling contact allows unprecipitated steam to precipitate and the tendency for product contamination is thus reduced.

The correlations shown above demonstrate that a centrifugal pump flushed with the liquid food product conveyed by it according to the invention has an impeller, the hydraulic conveying capacity of which, with respect to the impeller, must be greater than the hydraulic conveying capacity of the centrifugal pump actually arising at the pressure connector in the end result. If, in order to realize a flushed centrifugal pump of the discussed type, a hydraulically optimized centrifugal pump is selected, then its nominal conveying capacity must be selected accordingly higher by the aforementioned conveying capacity difference. In the case of the same nominal conveying capacity, an outer impeller diameter of the flushed centrifugal pump will thus need to be greater than one for a hydraulically optimized centrifugal pump.

The specific solution for converting the aforementioned inventive fundamental idea consists in that the rear and/or the front impeller gap, which must inevitably exist respectively between the impeller and the pump housing, is/are increased up to several times with respect to such a minimal front and rear impeller gap, which ensures the mechanical functionality of the centrifugal pump, by reducing the width of the impeller in the area of the front and the rear impeller gap. By enlarging this impeller gap, the generation of the desired and necessary flushing flows is first enabled. The respective width of the front and rear impeller gap can be calculated depending on the specific properties of the liquid food product.

In order to intensify the cooling, a further embodiment provides that the housing rear wall also be provided with a cooling medium space through which a cooling medium can flow.

A gapless cooling of the pump housing is ensured if, as is also suggested, in addition to the housing-cover-side cooling medium space and the housing-rear-wall-side cooling medium space, the inlet of the centrifugal pump is designed in the form of an intake connector protruding on the housing cover, which is provided with an intake-connector-side cooling medium space. Such a design is not mandatory in terms of the centrifugal pump according to the invention. Like a centrifugal pump in which the formation of an intake connector is foregone, the centrifugal pump is suitable for a direct connection between the intake connector of the centrifugal pump and an infuser vessel provided in its bottom part with a cooling medium space, wherein this cooling medium space extends down to an outlet opening leading out of the bottom part, which then represents the final end of the infuser vessel. The intake connector can then fulfill in this arrangement the function of a tubular section, which connects to the final outlet opening of the infuser vessel. An arrangement with the centrifugal pump according to the invention is also possible, in which the outlet opening as the final end of the infuser vessel is arranged directly on the housing cover of the centrifugal pump, wherein the formation of an intake connector is foregone there.

In all designs, namely in the case of a centrifugal pump according to the invention with or without an intake connector in combination with an infuser vessel, in which the outlet opening or a tubular section connecting to it represents the final end, an accumulation of heated liquid food product in the bottom part of the infuser vessel and in the connecting areas if applicable up to the inlet into the centrifugal pump is undesired since such an accumulation leads to an undesired and undefined dwell time, which should be prevented. In a connection with an infuser vessel, the centrifugal pump according to the invention has the object of immediately and completely discharging from it heated, liquid food product accumulated in the infuser vessel, without thereby becoming clogged even in the case of intermittent formation.

In order to intensify the flushing operation, it is further suggested that each blade channel between two neighboring blades of the impeller is in fluid-accessible connection in the area of its restricting impeller rear side with the rear impeller gap via at least one flushing bore hole penetrating the impeller rear side. The radial depth of engagement of the associated flushing flow can hereby be determined. In the most general case, the flushing bore hole involves passage openings of any type; i.e. an easy-to-produce circularity is not mandatory.

A preferred design provides that the front impeller gap on an outer impeller diameter of the impeller is subjected to a maximal enlargement and that this enlargement continuously decreases down to the minimal front impeller gap up to the area of the inlet into the blade channels. It is suggested in this regard that a reduction in the width of the impeller on the outer impeller diameter is 40 to 55%, preferably 50 to 55% of the width of a hydraulically optimized impeller. In the area of the front impeller gap, a second flushing flow forms, which extends from the area of the outlet of the centrifugal pump into the area of the inlet of the impeller. Through the enlargement of the front impeller gap, the circulation of the free leading edge of the blade of the open impeller present there even in the case of a narrow impeller gap, driven by the pressure difference between the pressure and intake side of the blade, is considerably strengthened, whereby a third flushing flow is generated according to plan.

With respect to the dimensioning of the rear impeller gap, it has been determined to be conducive if the access to the minimal rear, radially oriented impeller gap, which starts from the outer impeller diameter of the impeller and extends up to a hub of the impeller, is extended by up to 5 mm by reducing the outer impeller diameter. Moreover, an advantageous enlargement of the rear impeller gap according to the invention consists in that the impeller rear side in the area between the flushing bore hole and the hub of the impeller is subjected to an annular-surface-shaped cutout, the axial depth of which is up to 2 mm, preferably 0.5 to 1 mm.

The positioning, formed design and dimensioning of the flushing bore hole are characteristics with which the associated flushing flow is determined with respect to its radial depth of engagement, its molding and quantitative intensity. In the case of the arrangement of a single flushing bore hole in each blade channel, it is advantageous from a flow and production point of view if all of these flushing bore holes are arranged on a single hole circle with corresponding spacing.

With respect to the positioning of the flushing bore hole within the blade channel, it has been determined to be advantageous if the geometric location for the respective penetration point of the flushing bore hole with the impeller rear side, which also determines a hole circle diameter, is determined as follows:

approximately through the center of the blade channel, with respect to the separation distance of the blades at the penetration point and approximately through the center of a maximal flow filament length of the blade channel between its inlet and outlet.

The flushing bore hole is either designed circularly with a bore hole diameter or it has a shape deviating from the circular shape with a hydraulic diameter relevant for this shape. The hydraulic diameter is dimensioned as is generally known as a quotient of fourfold the passage cross-section of the flushing bore hole and the circumference of the flushing bore hole. It has been determined to be conducive if the bore hole diameter or the hydraulic diameter is 30 to 50% and in this area preferably 40 to 50% of the separation distance of the blades at the penetration point.

According to a further design, the invention also provides more than one flushing bore hole in each blade channel, wherein each of the several flushing bore holes of a blade channel is arranged on an associated hole circle and the hole circles are radially spaced with respect to each other. It is thereby conducive if the passage cross-sections of the flushing bore holes on the different hole circles become smaller with a decreasing hole circle diameter because the impulsive pressure difference at the flushing bore hole with a decreasing radial separation difference of the flushing bore hole from the rotational axis of the centrifugal pump becomes greater.

In order to ensure a cooling that satisfies the specific properties of the heated liquid food product, the invention provides the following circuits of the cooling medium space. According to a first suggestion in this regard, the if applicable present intake-connector-side cooling medium space, the housing-cover-side cooling medium space and the housing-rear-wall-side cooling medium space are supplied with cooling medium separately from each other. A second suggestion provides a design variant, in which at least two of the aforementioned cooling medium spaces are connected with each other in series. It is provided according to a third suggestion that the intake-connector-side cooling medium space is an integral section of the housing-cover-side cooling medium space.

In order to create the prerequisites for the flushing operation of the rear and/or the front impeller gap, the invention provides, starting from a hydraulically optimized centrifugal pump, preferably a commercially available centrifugal pump, that the rear and the front impeller gap are enlarged. This is realized either by bilateral turning of the impeller or by a spacer element acting axially in the direction of a pump shaft, which is arranged between the housing cover and the housing rear wall, wherein the impeller is not offset with respect to the housing rear wall or is correspondingly axially offset for or with the pump shaft in the pump chamber.

The selection of the hydraulically optimized centrifugal pump for this purpose is made with respect to the aforementioned difference of the nominal conveying capacity between the flushed and hydraulically optimized centrifugal pump.

The invention also comprises an impeller for a centrifugal pump, wherein the impeller is accommodated in a rotatable manner in the pump chamber of the centrifugal pump and the centrifugal pump is designed as explained above.

BRIEF DESCRIPTION OF THE DRAWINGS

A more detailed representation of the invention results from the following description and the attached figures of the drawing as well as from the claims. While the invention is realized in the various designs of a method of the generic type, the various embodiments of an installation for carrying out the method and the various embodiments of a centrifugal pump for such an installation, a preferred exemplary embodiment of a centrifugal pump according to the invention, which accommodates an impeller according to the invention in its pump housing and which is in fluid-accessible connection with an outlet opening of an infuser vessel is described below based on the drawing. In the figures

DETAILED DESCRIPTION OF THE INVENTION

Figure 1:
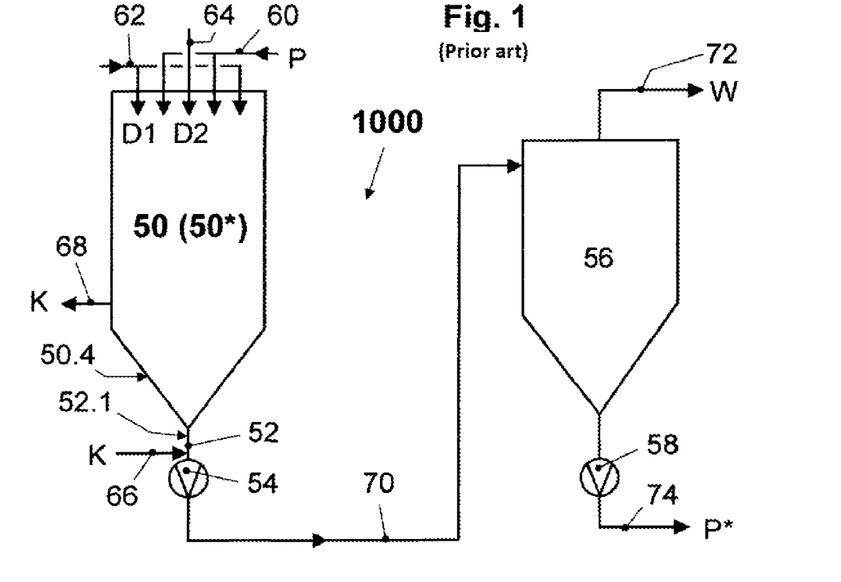
FIG. 1 shows in a schematic representation an installation for the treatment of heat-sensitive liquid food products according to the prior art.

An installation 1000 according to FIG. 1 (for example WO 2011/101077 A1) known from the prior art contains an infuser vessel 50, which has, as a known infuser vessel of the first type 50* (for example WO 2010/086082 A1) in its head space, a product inlet 60, via which a liquid food product P, which should be heat-treated, is supplied centrally and in an annular manner to this infuser vessel of the first type 50*. A first steam D1 is supplied radially outside to the supplied liquid food product P for the direct heating via an outer steam inlet 62, and a second steam D2 is supplied radially from inside via an inner steam inlet 64. The infuser vessel of the first type 50* is subjected to supply of cooling medium via an infuser-side cooling medium inlet 66 to a vessel-floor-side cooling medium space 50.4 for the cooling K of a floor of the infusion chamber of the first type 50*. The discharge of the cooling medium takes place via an infuser-side cooling medium outlet 68.

An outlet opening of the infuser vessel of the first type 50* is connected with a first conveying apparatus 54 via an outlet pipe 52, which is surrounded by an outlet-pipe-side cooling medium space 52.1, said first conveying apparatus 54 being designed as a displacement pump, preferably as a rotating one, and is arranged in a connection line 70 leading from the first conveying apparatus 54 to an inlet of a vacuum chamber 56. The first conveying apparatus 54 conveys the heated liquid food product P from the infuser vessel of the first type 50* to the vacuum chamber 56. The vacuum chamber 56 is designed to remove any amount of water W as so-called vapor steam from the heated liquid food product P cooling due to the pressure reduction, which is supplied to the infuser vessel of the first type 50* in the form of steam D, in the present case consisting of the first steam D1 and the second steam D2, and to divert it via a vapor outlet 72 preferably arranged in the upper area. A liquid food product P* treated in this manner exits the vacuum chamber 56 via a discharge line 74 preferably arranged in the bottom area on a tapering floor en route via a second conveying apparatus 58, which is preferably designed as a centrifugal pump.

Figure 2:
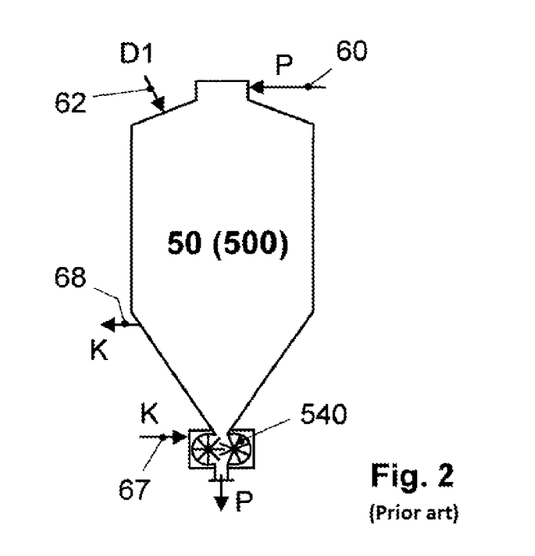
FIG. 2 shows in a schematic representation an infuser vessel for the direct heating of a liquid food product in a direct connection with a rotating displacement pump, wherein the arrangement is known from the prior art.

FIG. 2 shows an infuser vessel 50, which, as a known infuser vessel of the second type 500, is connected directly with a rotating displacement pump 540 at an outlet opening, which discharges the heated liquid food product P downwards (WO 2016/012026 A1). The liquid food product P is supplied centrally to the head area of the infuser vessel of the second type 540 via the product inlet 60 and the first steam D1 is introduced in a manner surrounding the central product stream via the outer steam inlet 62 radially from outside. A bottom part of the infuser vessel of the second type 500 is provided with a cooling K, which extends down to the rotating displacement pump 540 and into the pump housing. The supply of the cooling medium takes place at the rotating displacement pump 540 via a pump-side cooling medium inlet 67, its discharge via the infuser-side cooling medium outlet 68.

Figure 3:
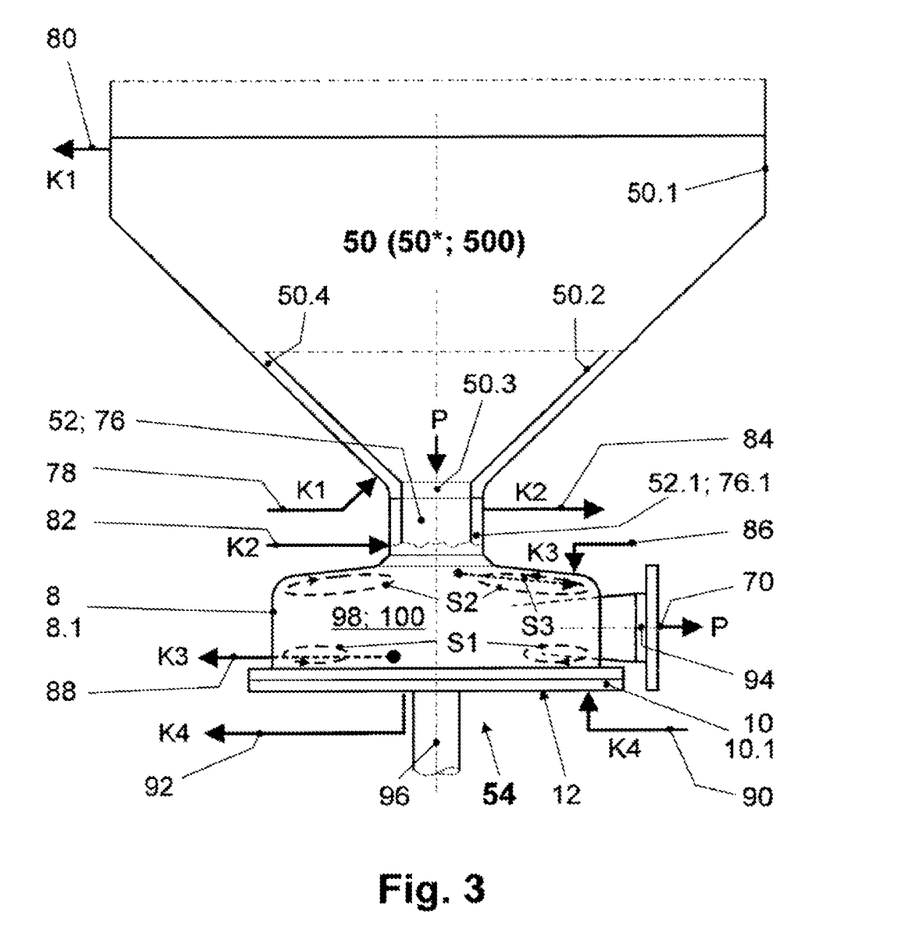
FIG. 3 shows a view of the centrifugal pump in the perpendicular direction both on its rotational axis as well as on the longitudinal axis of its pressure connector, wherein the rotational axis is oriented in the direction of gravitation force and the centrifugal pump is arranged directly on an outlet opening of an infuser vessel.

The arrangement position of a centrifugal pump 54 according to the invention shown in FIG. 3, in which the rotational axis of a pump shaft 96 is oriented in the direction of the gravitational force, is suitable for connecting this centrifugal pump 54 with an inlet 76 designed as an intake connector directly to an outlet opening 50.3 in a vessel floor 50.2 of an infuser vessel 50, which can be designed as an infuser vessel of the first or second type 50, 500 and subsequently stands for these designs. The infuser vessel 50 transitions into a preferably cylindrical vessel casing 50.1 above the preferably downwards tapering vessel floor 50.2. The vessel floor 50.2 and a partial section of the vessel casing 50.1 connecting to it are provided with a vessel-side cooling medium space 50.4, which has a first cooling medium inlet 78 for supplying and a first cooling medium outlet 80 for discharging a cooling medium for the cooling of the vessel floor K1.

The centrifugal pump 54 is suitable in a special manner for conveying heat-sensitive liquid food products P, such as milk protein concentrates, baby food, liquid baby food concentrates, nutritive beverages or milk used to make cheese, which enter the connection line 70 leading to the vacuum chamber 56 via the inlet 76 and exit from an outlet 94 designed as a pressure connector. The centrifugal pump 54 also has in the generally known manner a pump housing 12, which is formed by at least one housing cover 8 and a housing rear wall 10. A pump chamber 98 in fluid-accessible connection with the inlet 76 and the outlet 94, which accommodates an impeller 100 (for this, see FIGS. 4 and 5) in a rotating manner, is designed in the pump housing 12. A tubular section 52, 76 connects to the outlet opening 50.3, which can be formed either by the outlet pipe 52 leading out of the infuser vessel 50 or by an intake connector 76 of the centrifugal pump 54. If the tubular section 52, 76 is designed as an outlet pipe 52, then it can be surrounded by the outlet-pipe-side cooling medium space 52.1; if it is designed as an intake connector 76, then it can be surrounded by an intake-connector-side cooling medium space 76.1. In both cases, cooling medium for the cooling of the outlet pipe or the intake connector K2 is supplied to the cooling medium space 52.1, 76.1 via a second cooling medium inlet 82 and is discharged via a second cooling medium outlet 84.

The housing cover 8 is provided with a housing-cover-side cooling medium space 8.1, which preferably completely surrounds the housing cover 8 or partially borders it for example in the form of cooling pockets. Cooling medium for the cooling of the housing cover K3 is supplied to the housing-cover-side cooling medium space 8.1 via a third cooling medium inlet 86 and is discharged via a third cooling medium outlet 88. The housing rear wall 10 can be provided with a housing-rear-wall-side cooling medium space 10.1, which borders the housing rear wall 10 preferably completely or partially, for example in the form of cooling pockets. Cooling medium for the cooling of the housing rear wall K4 is supplied to the housing-rear-wall-side cooling medium space 10.1 via a fourth cooling medium inlet 90 and is discharged via a fourth cooling medium outlet 92. Finally, FIG. 3 shows, indicated approximately and schematically, a first flushing flow S1, a second flushing flow S2 and a third flushing flow S3 according to the invention, which are explained in greater detail in the FIGS. 4 and 5.

Figure 4:
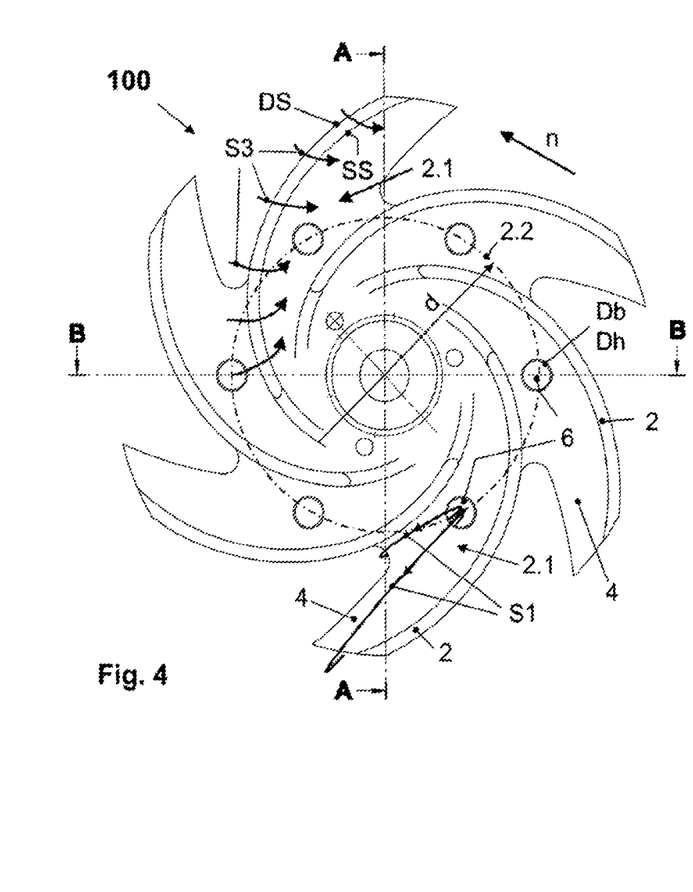
FIG. 4 shows a front view of the impeller of the centrifugal pump according to FIG. 3 with the approximate indication of a first and a third flushing flow S1, S3
Figure 5:
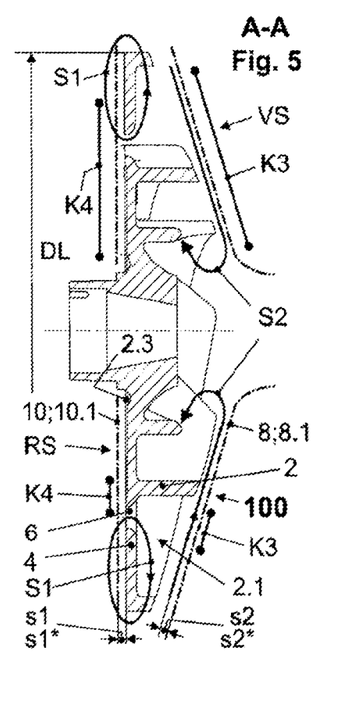
FIG. 5 shows in the lateral view a meridian section through the impeller according to FIG. 4 according to a cutting line labeled with A-A with the approximate indication of the first and a second flushing flow S1, S2.

The FIGS. 4 and 5 show the impeller 100 open toward the housing cover 8 and closed by an impeller rear side 4 toward the housing rear wall 10 with blades 2 bent backwards in one plane and with respect to a rotational direction n (see FIG. 4), which are respectively preferably located perpendicularly on the impeller rear side 4, wherein a blade channel 2.1 is formed respectively between two neighboring blades 2. The backwards-bent blading is not a mandatory characteristic of the impeller 100 for the centrifugal pump 54 according to the invention. A forwards-bent or a purely radially oriented blading in a planar or even spatial bend can be executed without restriction in terms of the realization of a flushed centrifugal pump 54 according to the invention. A rear side RS of the impeller 100 mainly formed by the impeller rear side 4 is distanced from the housing rear wall 10 by a rear impeller gap s1 (FIG. 5). A front side VS of the impeller 100 mainly formed by the leading edges of the blades 2 is also distanced from the housing cover 8 by a front impeller gap s2.

The rear and/or the front impeller gap s1, s2 is/are enlarged up to several times (by a factor of 1.5 to 10, preferably 2 to 5) with respect to this type of minimal rear and front impeller gap s1*, s2*, which ensures the mechanical functionality of the centrifugal pump 54, by reducing the width of the impeller 100 in the area of the front and rear impeller gap s1, s2.

A preferred embodiment provides that the front impeller gap s2 is subject to a maximal enlargement on an outer impeller diameter DL of the impeller 100, which decreases continuously down to the minimal front impeller gap s2* up to into the area of the inlet into the blade channel 2.1. This type of reduction of the width of the impeller 100 on the outer impeller diameter DL is preferably 40 to 55%, here preferably 50 to 55%, of the width of a hydraulically optimized impeller.

A further preferred embodiment provides that the access to the minimal rear, radially oriented impeller gap s1*, which starts from the outer impeller diameter DL of the impeller 100, and extends up to a hub of the impeller 100, is expanded by reducing the outer impeller diameter DL by up to 5 mm, whereby the impeller 100 retreats back a bit radially outside with respect to the pump housing 12. An enlargement of the rear impeller gap s1 consists according to the invention and preferably in that the impeller rear side 4 is subjected to an annular-surface-shaped cutout 2.3 in the area between the flushing bore hole 6 and the hub of the impeller 100 (see FIG. 5), the axial depth of which is up to 2 mm, preferably 0.5 to 1 mm. A dimensioning of the front and/or of the rear impeller gap s1, s2 in the manner described above depends on the specific properties of the heated liquid food product P and is preferably determined in field tests.

Each blade channel 2.1 between two neighboring blades 2 of the impeller 100 is in fluid-accessible connection with the rear impeller gap sl in the area of its adjacent impeller rear side 4 via at least one flushing bore hole 6 penetrating the impeller rear side 4 (FIG. 5).

According to a preferred embodiment, all of these flushing bore holes 6 are arranged on a single hole circle 2.2 with a hole circle diameter d in the case of a single flushing bore hole 6 in each blade channel 2.1. The geometric location for the respective penetration point of the flushing bore hole 6 with the impeller rear side 4, which also determines the hole circle diameter d, is thereby approximately determined by the center of the blade channel 2.1, with respect to the separation distance of the blades 2 at the penetration point, and approximately by the center of a maximal flow filament length of the blade channel 2.1 between its inlet and outlet.

The flushing bore hole 6 is designed either preferably circularly with a bore hole diameter Db or it has alternatively a shape deviating from the circular form with a hydraulic diameter Dh relevant for this shape (FIG. 4). It is thereby preferably suggested that the bore hole diameter Db or the hydraulic diameter Dh is 30 to 50% and in this area preferably 40 to 50% of the separation distance from the blades 2 at the penetration point.

The invention further provides that more than one flushing bore hole 6 is provided in each blade channel 2.1, that each of the several flushing bore holes 6 of a blade channel 2.1 is arranged on an associated hole circle 2.2 and that the hole circles 2.2 are spaced radially from each other. The flushing bore holes 6 on different hole circles 2.2 can be designed with the same diameters Db or respectively hydraulic diameters Dh or with different diameters Db or respectively hydraulic diameters Dh from hole circle to hole circle. Due to the pressure difference decreasing from inside to outside in the radial direction between the rear wheel side space and the blade channel 2.1, an advantageous embodiment provides that the passage cross-sections of the flushing bore holes 6 on the different hole circles 2.2 become smaller with a decreasing hole circle diameter d. The bore hole diameters Db or the hydraulic diameters Dh of the flushing bore holes 6 thus tend to be smaller the closer they get to the hub area of the impeller 100 if a certain flushing volume flow needs to be achieved.

At least the housing cover 8 with the housing-cover-side cooling medium space 8.1 that a cooling medium can flow through is provided. If necessary, the housing rear wall 10 can be cooled via a housing-rear-wall-side cooling medium space 10.1. According to an advantageous embodiment, in addition to the housing-cover-side cooling medium space 8.1 and the housing-rear-wall-side cooling medium space 10.1, the inlet 76, if designed as an intake connector, is provided with the intake-connector-side cooling medium space 76.1. It is suggested that the intake-connector-side cooling medium space 76.1, the housing-cover-side cooling medium space 8.1 and the housing-rear-wall-side cooling medium space 10.1 are supplied with cooling medium separately from each other. Another embodiment provides that at least two cooling medium spaces 76.1, 8.1, 10.1 are connected with each other in series. According to a further suggestion, the intake-connector-side cooling medium space 76.1 is an integral section of the housing-cover-side cooling medium space 8.1.

The following measures, with which a centrifugal pump according to the prior art is to be modified according to the invention, ensure in combination with each other or respectively also alone the flushing operation of the impeller 100 according to the invention:

Enlargement of the rear impeller gap s1 and/or the front impeller gap s2 (see FIG. 5) either
  by bilateral turning of the impeller 100
  or by a spacer element acting axially in the direction of the pump shaft 96, which is arranged between the housing cover 8 and the housing rear wall 10, wherein the impeller 100 is not offset with respect to the housing rear wall 10 or is correspondingly axially offset with the pump shaft 96 in the pump chamber 98.

Arrangement of the aforementioned flushing bore holes 6 in the manner described above.

The FIGS. 4 and 5 illustrate the effects of the aforementioned measures according to the invention. By the widening of the rear impeller gap s1 or respectively by the expanded access to it, the associated rear wheel side space is supplied in a more or less unrestricted manner with the prevailing static pressure on the outlet side of the impeller 2, which there has the outer impeller diameter DL, over its entire radial extension area. A lower static pressure than in the rear wheel side space is present at the respective flushing bore hole 6 in the blade channel 2.1. The first flushing flow S1 directed radially from inside to outside, as shown in FIG. 5 and in FIG. 4, in the latter only as an example on a blade channel 2.1, thereby results in the blade channel 2.1 due to the causal flow-through of the flushing bore hole 6 from the rear wheel side space into the blade channel 2.1. Since the heated liquid food product P located in the rear wheel side space can be cooled at the housing rear wall 10, because the cooling of the housing rear wall K4 is provided there if applicable, liquid food product P permanently cooled by the first flushing flow S1 now makes its way preferably into the core area of the flow in the blade channel 2.1.

By the described widening of the front impeller gap s2, the third flushing flow S3 can form, as is shown in FIG. 4 in the left upper quadrant of the impeller 100, seen via the respective front-side, free leading edge of the blade 2 and over its radial extension area. The driving forces for this third flushing flow S3 result from the pressure difference at each blade 2, which is given by the static pressure on the blade top side, a pressure side DS, and by the static pressure on the blade bottom side, an intake side SS. The third flushing flow S3 ensures an additional movement with respect to the housing cover 8 and predominantly in the circumferential direction to it and thus a forced cooling of the liquid food product P, because the cooling of the housing cover K3 is installed in this housing cover 8 (see FIG. 5). The third flushing flow S3 also effectuates here an exchange of the liquid food product into and out of the core area of the flow in the associated blade channel 2.1. Through the widened front impeller gap s2, the radially oriented second flushing flow S2 can form due to the difference between the static pressure at the outlet of the impeller 100 and the static pressure in the intake-side inlet of the impeller 100 (see FIG. 5), which superimposes the third flushing flow S2. This second flushing flow S2 also ensures here an exchange of the liquid food product P into and out of the core area of the flow in the associated blade channel 2.1.

Exemplary Embodiment of a Centrifugal Pump 54 According to the Invention

The centrifugal pump 54 is driven by a drive motor with a nominal capacity of 15 kW at a nominal speed n=2900 l/min. The outer impeller diameter DL is reduced from an original 205 mm to 195 mm. The impeller width on the outer impeller diameter DL is reduced from an original 19 mm to 9 mm, wherein the reduction declines continuously until the area of the inlet into the blade channel 2.1 down to the minimal front impeller gap s2*. The rear impeller gap sl is enlarged by 0.7 mm in the area of the annular-surface-shaped cutout 2.3 with respect to the minimal rear impeller gap s1*. Each flushing bore hole 6 in the associated blade channel 2.1 of the total of six blade channels 2.1 is designed circularly and has a bore hole diameter Db=10 mm.

The measures described above according to the invention can also be applied analogously to a closed impeller, wherein a third flushing flow S3 is then inevitably impossible via the front-side leading edge of the respective blade 2 in the aforementioned manner. As a replacement for these flushing paths, a cover plate of the impeller 100 would then be provided with further flushing bore holes, which connect the respectively associated blade channel with a front wheel side space, formed between the cover plate and the housing cover 8. A flushing flow adequate for the first flushing flow S1 described above would then arise.

REFERENCE LIST OF THE USED ABBREVIATIONS

1000 Installation
50 Infuser vessels, general
50* Infuser vessel of the first type
500 Infuser vessel of the second type
50.4 Vessel-floor-side cooling medium space
Outlet pipe
52.1 Outlet-pipe-side cooling medium space
54 First conveying apparatus
540 Rotating displacement pump
56 Vacuum chamber
58 Second conveying apparatus
60 Product inlet
62 Outer steam inlet
64 Inner steam inlet
66 Infuser-side cooling medium inlet
67 Pump-side cooling medium inlet
68 Infuser-side cooling medium outlet
70 Connection line
72 Vapor outlet
74 Discharge line (for treated food product)
D Steam
D1 First steam
D2 Second steam
K Cooling
P Liquid food product
P* Treated food product
W Water
50 Infuser vessel
50* Infuser vessel of the first type
500 Infuser vessel of the second type
50.1 Vessel casing
50.2 Vessel floor
50.3 Outlet opening
50.4 Vessel-floor-side cooling medium space
8 Housing cover
8.1 Housing-cover-side cooling medium space
10 Housing rear wall
10.1 Housing-rear-wall-side cooling medium space
12 Pump housing
54 Centrifugal pump
76 Inlet (intake connector)
76.1 Intake-connector-side cooling medium space
78 First cooling medium inlet
80 First cooling medium inlet
82 Second cooling medium inlet
84 Second cooling medium outlet
86 Third cooling medium inlet
88 Third cooling medium outlet
90 Fourth cooling medium inlet
92 Fourth cooling medium outlet
94 Outlet (pressure connector)
96 Pump shaft
98 Pump chamber
100 Impeller
K1 Cooling of the vessel floor
K2 Cooling of the outlet pipe or the intake connector
K3 Cooling of the housing cover
K4 Cooling of the housing rear wall
S1 First flushing operation
S2 Second flushing operation
S3 Third flushing operation
2 Blade
2.1 Blade channel
2.2 Hole circle
2.3 Annular-surface-shaped cutout
4 Impeller rear side
6 Flushing bore hole
DL Outer impeller diameter
Db Bore hole diameter
Dh Hydraulic diameter
DS Pressure side (blade)
RS Rear side (impeller)
SS Intake side (blade)
VS Front side (impeller)
d Hole circle diameter
s1 Rear impeller gap
s1* Minimal rear impeller gap
s2 Front impeller gap
s2* Minimal front impeller gap
n Direction of rotation

The invention claimed is:

1. A method, comprising:
treating liquid food products after direct heating, wherein steam directly heats the liquid food product in an infuser vessel forming a sterile state, wherein an amount of water corresponding to that of the steam is removed from the liquid food product by decompression, and wherein a centrifugal pump conveys the liquid food product between the heating and the decompression, the method further comprising:
(a) circulating a first cooling medium that provides a first cooling of the liquid food product located on a floor of the infuser vessel up to an outlet opening;
(b) circulating a second cooling medium that provides a second cooling of the liquid food product located in a tubular section that is connected directly to the outlet opening, wherein the tubular section is formed by one of an outlet pipe leading out of the infuser vessel and an intake connector of the centrifugal pump;
(c) circulating a third cooling medium that provides a third cooling of the liquid food product located in a housing cover of a pump housing of the centrifugal pump, wherein the housing cover connects to one of the outlet pipe and an intake connector;
(d) performing a flushing operation of the pump housing and of an impeller via a rear impeller gap positioned between a housing rear wall of the centrifugal pump and the impeller; and
performing the flushing operation via a front impeller gap located between the housing cover and the impeller, wherein the impeller is open towards the housing cover, and wherein volume flows of the flushing operations is greater than equalization flows via the front impeller gap and the rear impeller gap within the pump housing.

2. The method according to claim 1, further comprising circulating a fourth cooling medium that provides a fourth cooling, wherein the fourth cooling medium is circulated in the housing rear wall of the pump housing.

3. The method according to claim 2, wherein the flushing operation comprises a first flushing and a second flushing generated by recirculation of the liquid food product via the impeller and driven by pressure differences in the pump housing.

4. The method according to claim 3, wherein the first flushing takes place via the rear impeller gap defined between the impeller and the housing rear wall, and wherein the first flushing engages in a flow of liquid food product through the impeller.

5. The method according to claim 4, wherein the second flushing takes place via the front impeller gap defined between the housing cover and the impeller, wherein the second flushing engages in a flow of liquid food product through the impeller.

6. The method according to claim 5, wherein the flushing operation further comprises a third flushing generated by equalization flows of liquid food product between a respective pressure and suction side of a blade of the impeller and via the front impeller gap.

7. The method according to claim 3, wherein the first cooling, the second cooling, the third cooling, and the fourth cooling are operated separately from each other.

8. The method according to claim 6, wherein at least two of the first cooling, the second cooling, the third cooling, and the fourth cooling are connected in series.

9. The method according to claim 1, wherein a ratio of the volume flows to the equalization flows is between 1.5 and 10.

10. The method according to claim 1, wherein a ratio of the volume flows to the equalization flows is between 2 and 5.

11. The method of claim 2, wherein the first cooling medium is circulated in a vessel-floor-side cooling medium space, the second cooling medium is circulated in an intake-connection-side cooling medium space, the third cooling medium is circulated in a housing-cover-side cooling medium space, and the fourth cooling medium is circulated in a housing-rear wall-side cooling medium space, and wherein the vessel-floor-side cooling medium space, the intake-connection-side cooling medium space, the housing cover-side cooling medium space, and the housing-rear-wall side cooling medium space are each fluidly separate from one another.

12. The method of claim 2, wherein the first cooling medium is circulated in a vessel-floor-side cooling medium space, the second cooling medium is circulated in an intake-connection-side cooling medium space, the third cooling medium is circulated in a housing-cover-side cooling medium space, and the fourth cooling medium is circulated in a housing-rear wall-side cooling medium space, and wherein the vessel-floor-side cooling medium space, the intake-connection-side cooling medium space, the housing cover-side cooling medium space, and the housing-rear-wall side cooling medium space are each fluidly connect to one another.

* * * * *